United States Patent
You et al.

(10) Patent No.: US 10,660,080 B2
(45) Date of Patent: *May 19, 2020

(54) TRANSMISSION/RECEPTION METHOD FOR MTC APPARATUS

(71) Applicant: LG ELECTRONICS INC., Seoul (KR)

(72) Inventors: Hyangsun You, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,862

(22) Filed: Feb. 22, 2019

(65) Prior Publication Data

US 2019/0191423 A1    Jun. 20, 2019

Related U.S. Application Data

(63) Continuation of application No. 14/907,018, filed as application No. PCT/KR2014/005548 on Jun. 24, 2014, now Pat. No. 10,257,816.

(Continued)

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/2643* (2013.01); *H04B 7/2656* (2013.01);
(Continued)

(58) Field of Classification Search
CPC ..... H04L 5/001; H04L 5/0094; H04L 5/1469; H04W 4/70; H04W 72/042
See application file for complete search history.

(56) References Cited

U.S. PATENT DOCUMENTS

2013/0114565 A1   5/2013  Chen et al.
2013/0195041 A1*  8/2013  Papasakellariou .. H04W 72/042
                                                          370/329
(Continued)

OTHER PUBLICATIONS

CATT, "Conclusion and recommendations for low-cost MTC UEs", R1-131887, 3GPP TSG RAN WG1 Meeting #73, Fukuoka, Japan, May 20-24, 2013.

(Continued)

*Primary Examiner* — Marcus Smith
(74) *Attorney, Agent, or Firm* — Birch, Stewart, Kolasch & Birch, LLP

(57) ABSTRACT

A method for transmitting a physical uplink shared channel (PUSCH) is discussed. The method is performed by a wireless device and includes receiving downlink control information (DCI), which is repeated on a plurality of downlink subframes, identifying a last subframe on which the repetition is completed, determining that the identified last subframe is not used for determining a start subframe to repeatedly transmit the PUSCH, substituting the last subframe with a first subframe usable for determining the start subframe to transmit the PUSCH after the identified last subframe, based on the determination that the identified last subframe is not used for determining the start subframe; determining the start subframe to transmit the PUSCH, based on the first subframe other than the last subframe, and transmitting the PUSCH repeated over a plurality of subframes starting from the determined start subframe.

14 Claims, 16 Drawing Sheets

Related U.S. Application Data

(60) Provisional application No. 61/858,628, filed on Jul. 26, 2013.

(51) Int. Cl.

| | | |
|---|---|---|
| *H04L 5/14* | (2006.01) | |
| *H04B 7/26* | (2006.01) | |
| *H04W 4/70* | (2018.01) | |
| *H04W 76/00* | (2018.01) | |
| *H04W 72/00* | (2009.01) | |

(52) U.S. Cl.
CPC .......... *H04L 5/0053* (2013.01); *H04L 5/0094* (2013.01); *H04W 4/70* (2018.02); *H04W 76/00* (2013.01); *H04L 5/001* (2013.01); *H04L 5/1469* (2013.01); *H04W 72/00* (2013.01)

(56) References Cited

U.S. PATENT DOCUMENTS

| | | |
|---|---|---|
| 2014/0003374 A1 | 1/2014 | Kuo |
| 2014/0153453 A1 | 6/2014 | Park et al. |
| 2014/0198644 A1 | 7/2014 | Basilier et al. |
| 2014/0301302 A1 | 10/2014 | Xu et al. |
| 2015/0029890 A1 | 1/2015 | Siomina et al. |
| 2015/0237644 A1 | 8/2015 | Golitschek Edler von Elbwart et al. |
| 2015/0264708 A1* | 9/2015 | Li .......... H04W 28/06 370/329 |
| 2015/0305057 A1 | 10/2015 | Eriksson et al. |
| 2016/0081065 A1 | 3/2016 | Shi et al. |
| 2016/0081122 A1* | 3/2016 | Tang ........ H04L 5/0055 370/329 |
| 2016/0174245 A1* | 6/2016 | Guo ......... H04W 72/12 370/280 |
| 2017/0230948 A1 | 8/2017 | Chen et al. |

OTHER PUBLICATIONS

MediaTek Inc., "Text Proposal on (E)PDCCH Coverage Enhancement for Section 9.5.3 of TR 36.888", R1-131822, 3GPP TSG RAN WG1 Meeting #72bis, Chicago, USA, Apr. 15-19, 2013.

Qualcomm Incorporated, "General Considerations for MTC Coverage Enhancements", R1-132490, 3GPP TSG-RAN WG1 #73, Fukuoka, Japan, May 20-May 24, 2013.

Samsung, "Coverage enhancements for low-cost MTC UEs", R1-131973, 3GPP TSG RAN WG1 Meeting #73, Fukuoka, Japan, May 20-24, 2013.

\* cited by examiner

TRANSMISSION/RECEPTION METHOD FOR MTC APPARATUS

CROSS-REFERENCE TO RELATED APPLICATIONS

This Application is a Continuation of U.S. patent application Ser. No. 14/907,018 filed on Jan. 22, 2016 (now U.S. Pat. No. 10,257,816), which is the National Phase of PCT International Application No. PCT/KR2014/005548 filed on Jun. 24, 2014, which claims the priority benefit under 35 U.S.C. § 119(e) to U.S. Provisional Application No. 61/858,628 filed on Jul. 26, 2013, all of which are hereby expressly incorporated by reference into the present application.

BACKGROUND OF THE INVENTION

Field of the Invention

The present invention relates to mobile communication.

Discussion of the Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Recently, it is considered to extend cell coverage of a BS for an MTC apparatus, and various schemes for extending the cell coverage are under discussion. However, when the cell coverage is extended, if the BS transmits a channel to the MTC apparatus located in the coverage extension region as if transmitting a channel to a normal UE, the MTC apparatus has a difficulty in receiving the channel.

Further, as the MTC apparatus is expected to have low performance in order to supply more MTC apparatuses at a low price, if the BS transmits a PDCCH or a PDSCH to the MTC apparatus located in the coverage extension region as if transmitting a PDCCH or a PDSCH to a normal UE, the MTC apparatus has a difficulty in receiving the PDCCH or the PDSCH.

SUMMARY OF THE INVENTION

Accordingly, the disclosure of the specification has been made in an effort to solve the problem.

To achieve the foregoing purpose, when a machine-type (MTC) apparatus is located in a coverage extension region of a base station (BS), the BS may repeatedly transmit PDCCHs or PDSCHs (that is, transmit a bundle of PDCCHs or PDSCHs) on a plurality of subframes.

However, repeatedly transmitting PDCCHs or PDSCHs (that is, transmitting a bundle of PDCCHs or PDSCHs) on a plurality of subframes may cause a problem to PUCCH/PUSCH transmission timings.

To solve such a problem, an embodiment of the present invention provides a transmission and reception method of a machine-type communication (MTC) apparatus. The method may comprise: receiving information on a specific number of downlink control channels which are bundled and receivable on a plurality of downlink subframes; and determining a position of a downlink subframe in which reception of the bundle of the specific number of downlink control channels is to be finished according to a time division duplex (TDD) uplink/downlink configuration. When reception of the bundle of downlink control channels is not finished at the position of the determined downlink subframe, it is assumed that reception of the bundle of downlink control channels continues up to a position of an earliest downlink subframe in which reception of the bundle of the specific number of downlink control channels is finished among TDD based subframes.

The method may further comprise: determining a position of a subframe for transmitting an uplink channel based on the position of the earliest downlink subframe when reception of the bundle of PDCCHs continues over the position of the determined downlink subframe.

The uplink channel may comprise a physical uplink control channel (PUCCH) or physical uplink shared channel (PUSCH). The control channels may be a physical downlink control channel (PDCCH).

Positions of downlink subframes in which reception of the bundle of the specific number of downlink control channels may be finished are expressed in a table according to the TDD uplink/downlink configuration.

To solve the foregoing problem, an embodiment of the present invention provides a machine-type communication (MTC) apparatus. The MTC apparatus may comprise: a transceiver to receive information on a specific number of downlink control channels which are bundled and receivable on a plurality of downlink subframes; and a processor to control the transceiver to determine a position of a downlink subframe in which reception of the bundle of the specific number of downlink control channels is to be finished according to a time division duplex (TDD) uplink/downlink configuration. Here, when reception of the bundle of downlink control channels is not finished at the position of the determined downlink subframe, the processor assumes that reception of the bundle of downlink control channels continues up to a position of an earliest downlink subframe in which reception of the bundle of the specific number of downlink control channels is finished among TDD based subframes.

According to the disclosure of the present specification, the problem of the foregoing conventional technology is solved. More specifically, according to the disclosure of the present specification, the reception performance and decoding performance of a machine-type communication (MTC) apparatus located in a coverage extension region of a base station may be improved.

DETAILED DESCRIPTION OF THE EMBODIMENTS

Figure 1:
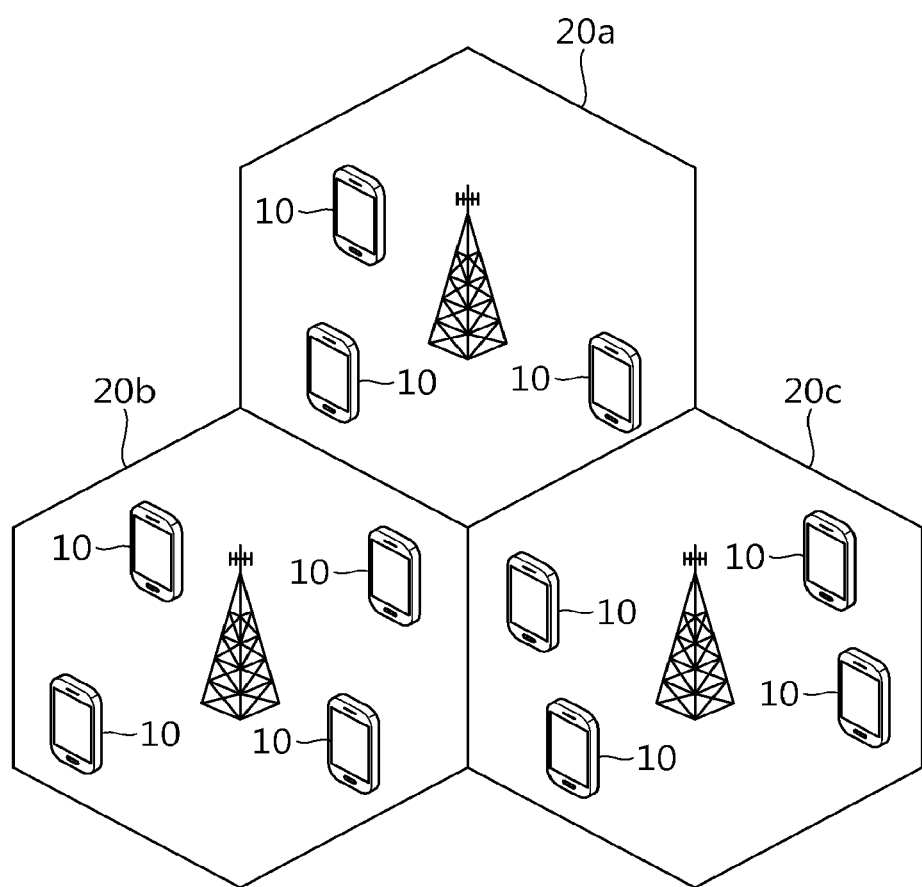
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms "first" and "second." The terms "first" and "second" are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, "base station" generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
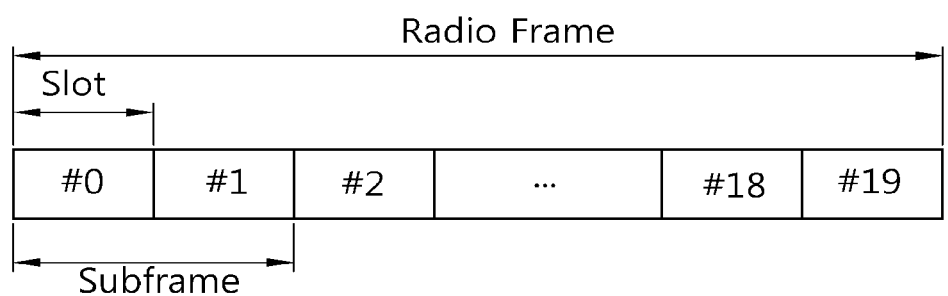
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
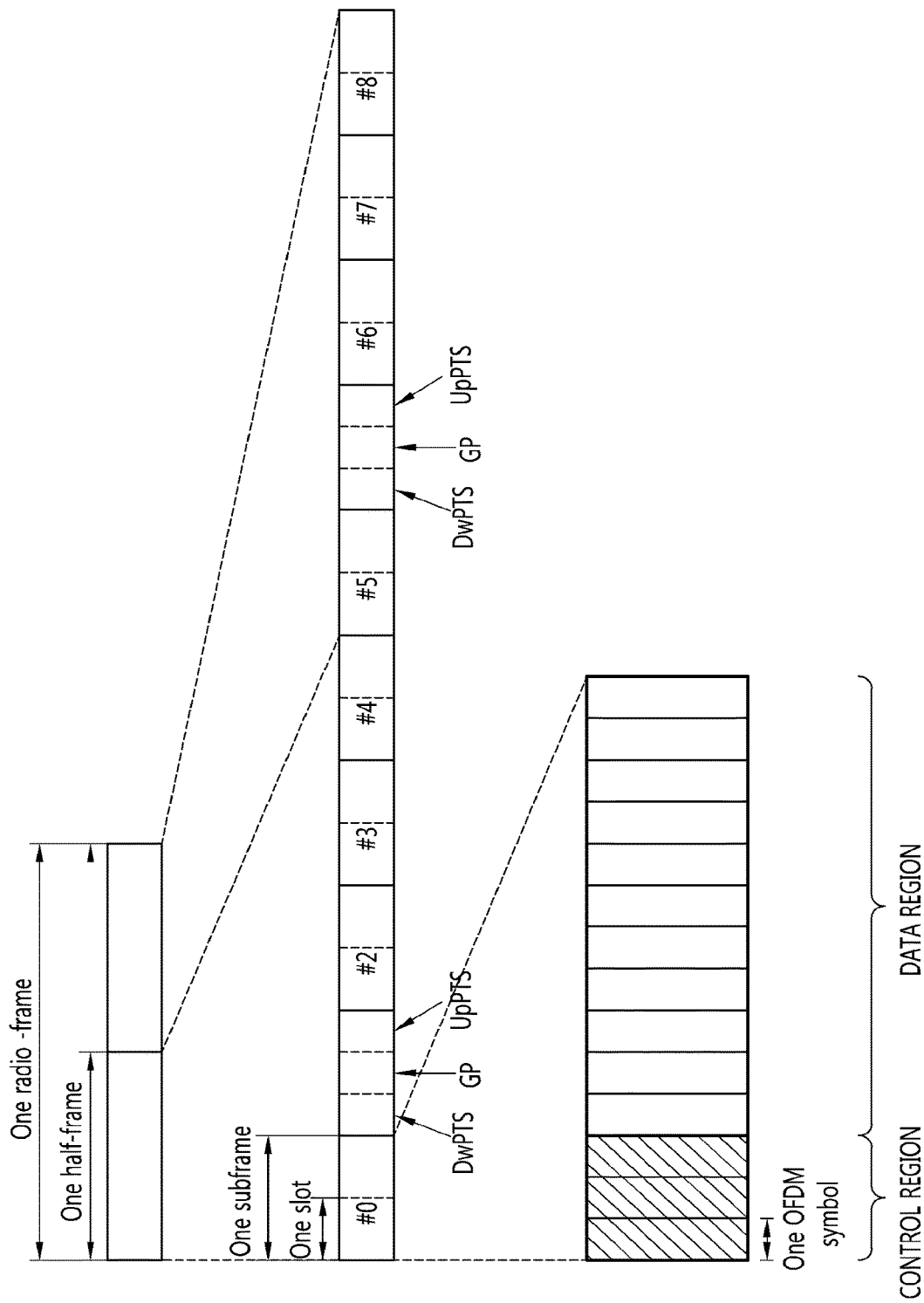
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch.4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot:DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL Configuraiton | Switch-point period-icity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Here, 'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
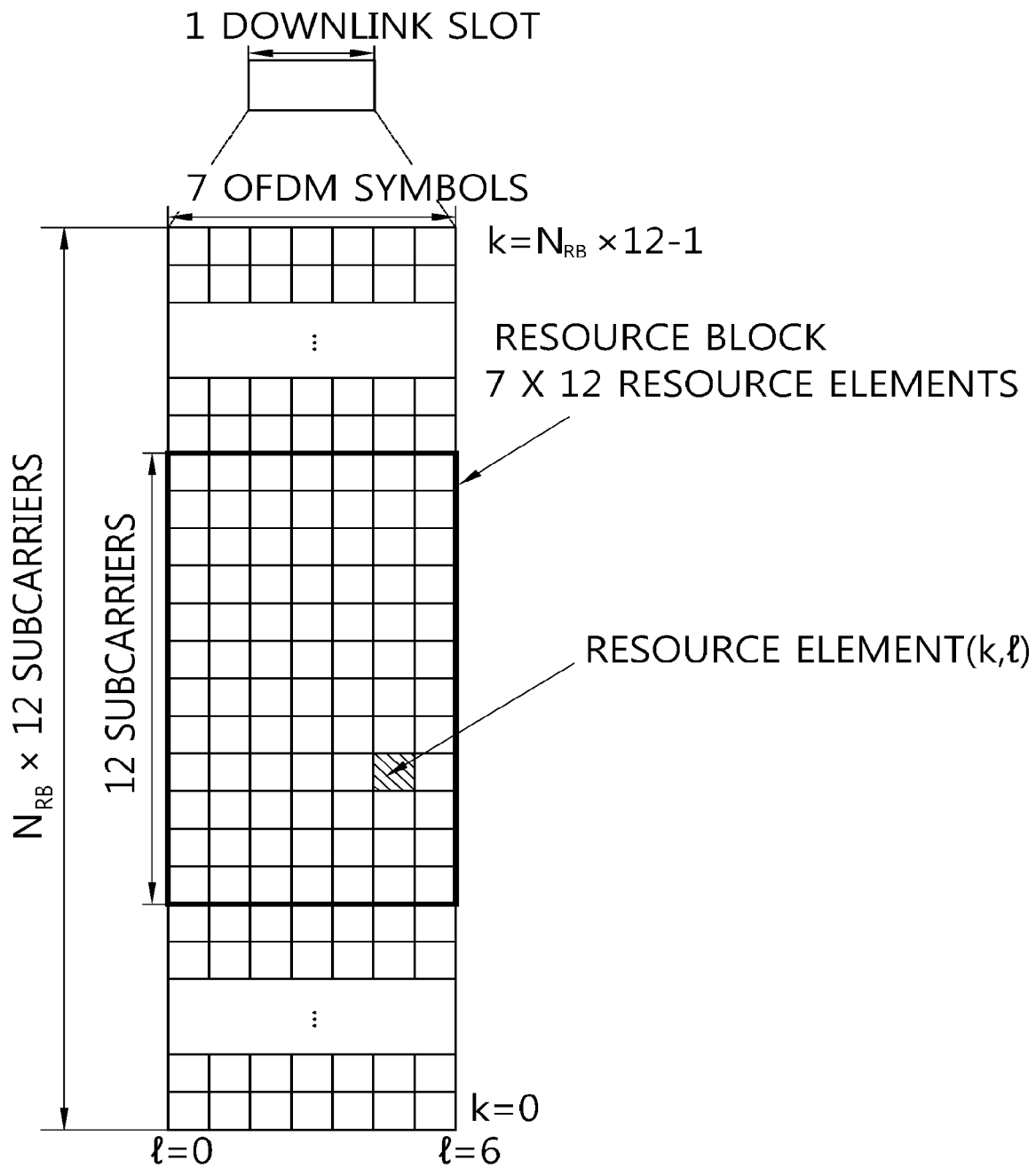
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
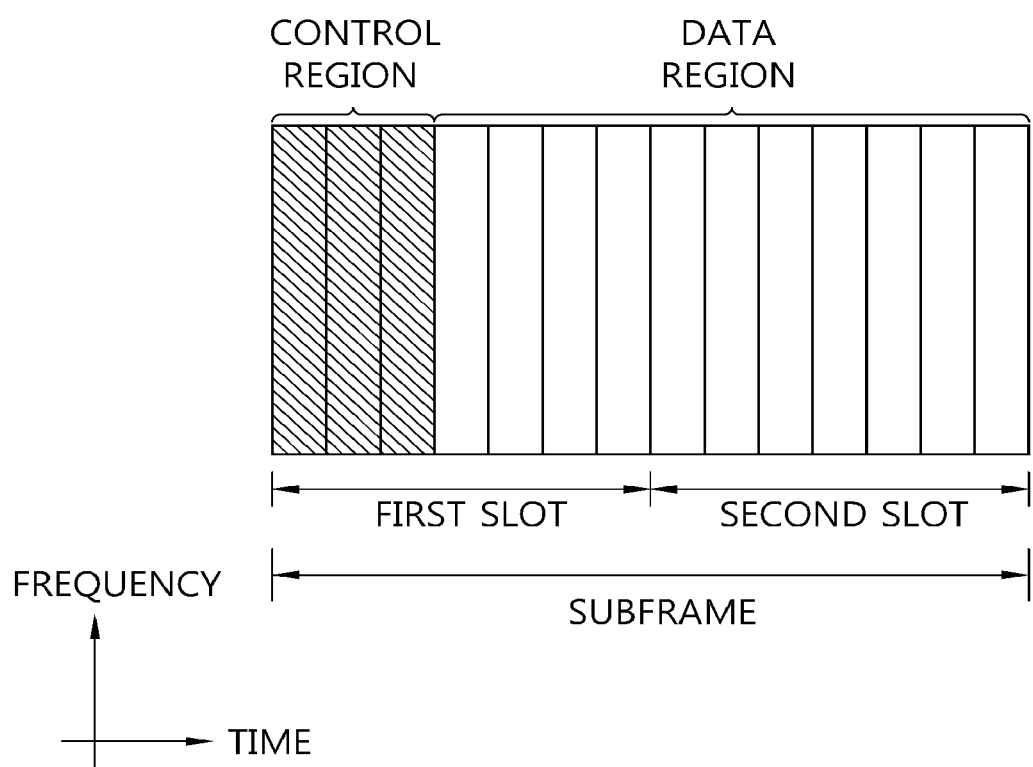
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block), In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
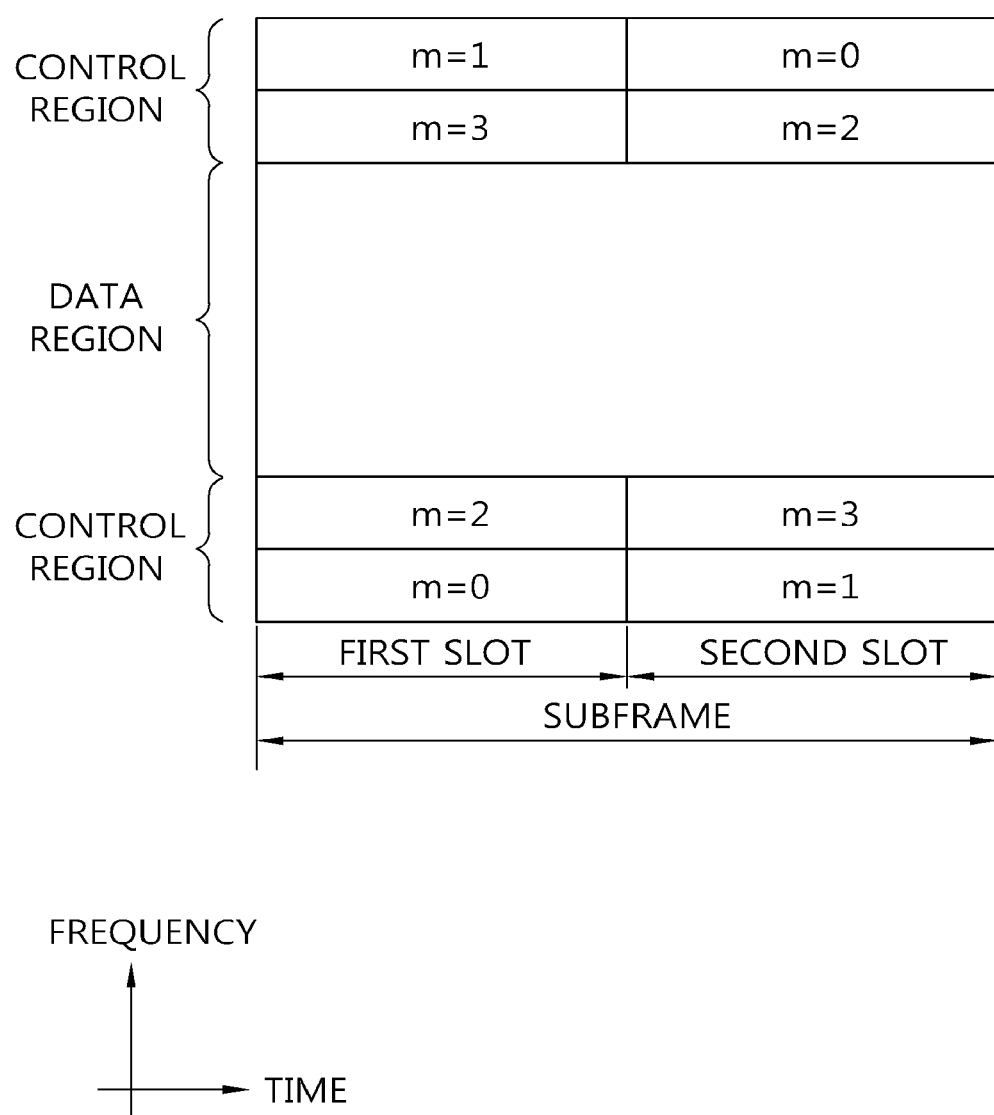
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
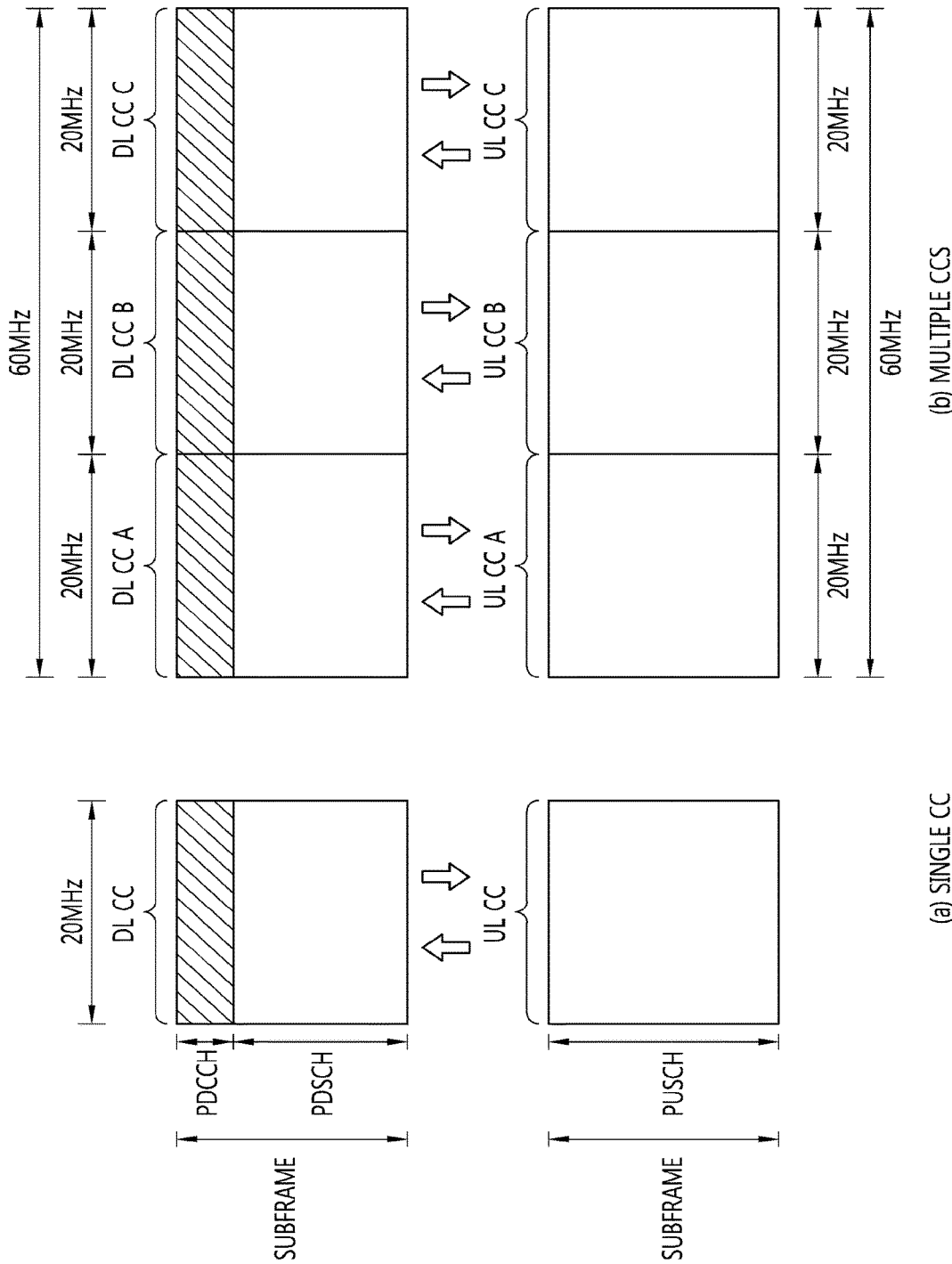
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
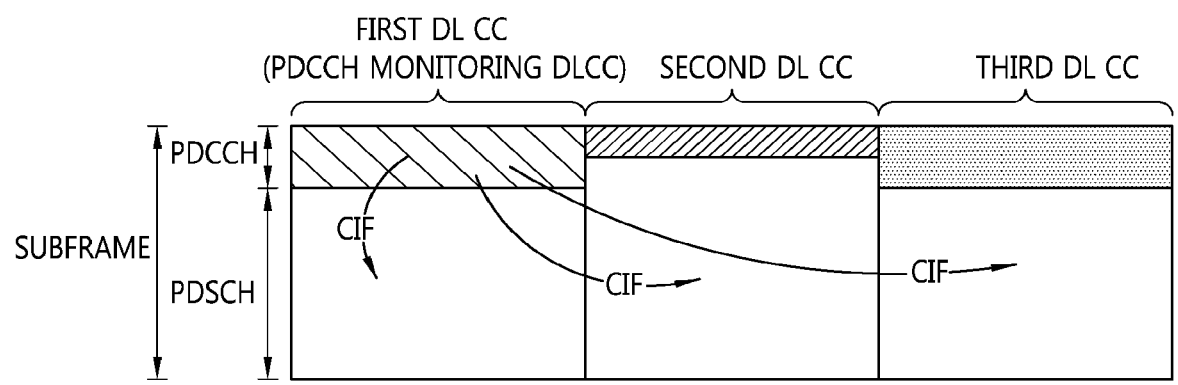
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
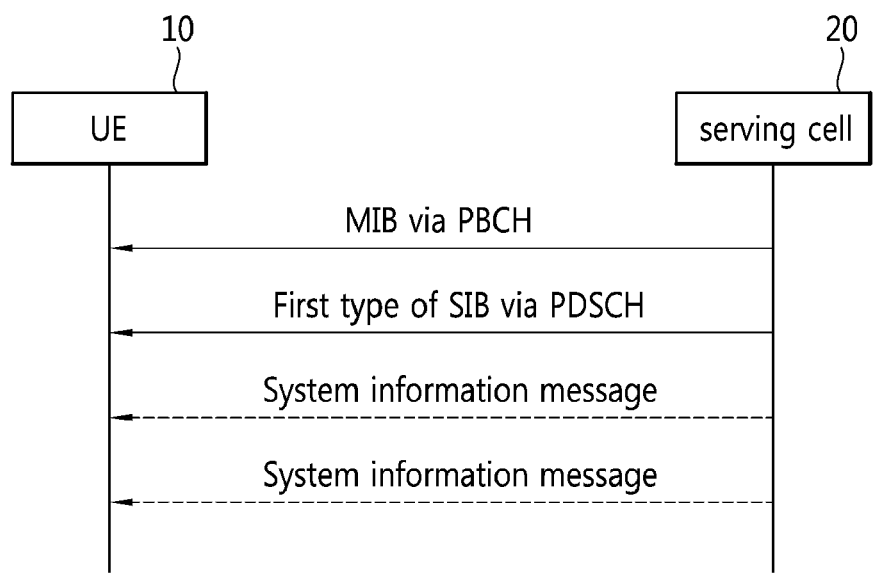
FIG. 9 illustrates an example of transmitting system information.

FIG. 9 illustrates an example of transmitting system information.

System information is classified into a master information block (MIB) and a plurality of system information blocks (SIB). The MIB includes the most important physical layer information on a cell. The SIBs includes different types. A first type of SIB includes information used to evaluate whether a UE is allowed to access a cell and scheduling information on another type of SIB. A second type of SIB (SIB type 2) includes information on common and shared channels. A third type of SIB (SIB type 3) includes cell reselection information related mostly to a serving cell. A fourth type of SIB (SIB type 4) includes frequency information on a serving cell and intra-frequency information on a neighbor cell related to cell reselection. A fifth type of SIB (SIB type 5) includes information on another E-UTRA frequency and inter-frequency information on a neighbor cell related to cell reselection. A sixth type of SIB (SIB type 6) includes information on a UTRA frequency and information on a UTRA neighbor cell related to cell reselection. A seventh type of SIB (SIB type 7) includes information on a GERAN frequency related to cell reselection.

As shown in FIG. 9, the MIB is transmitted to a UE 10 via a PBCH. The first type of SIB (SIB type 1) is mapped to a DL-SCH and transmitted to the UE 10 via a PDSCH. Other types of SIBs are transmitted to the UE via a PDSCH through a system information message.

Hereinafter, MTC will be described.

Figure 10A:
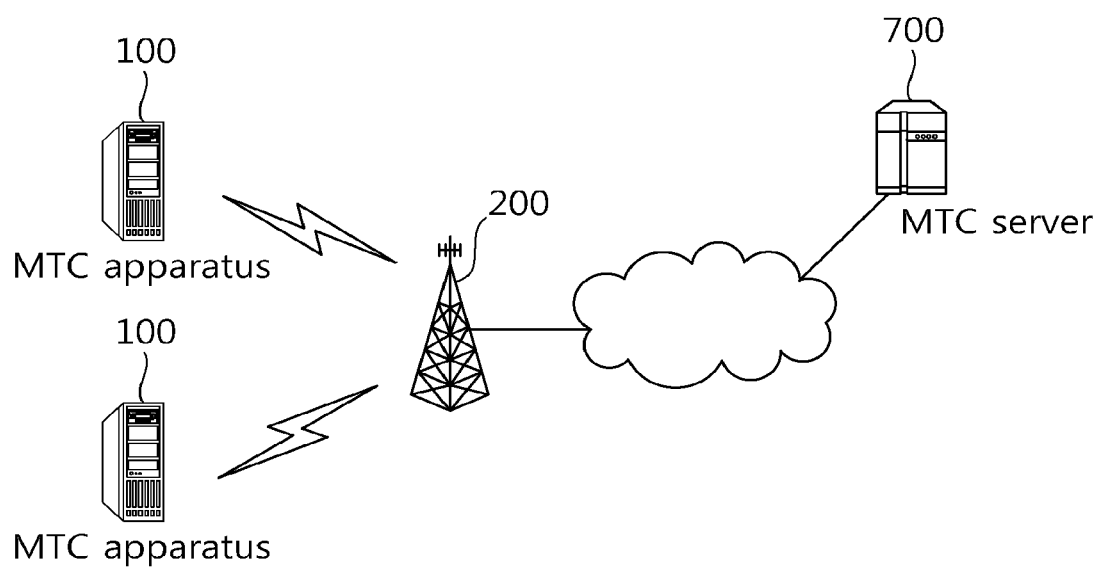
FIG. 10A illustrates an example of machine-type communication (MTC).

FIG. 10A illustrates an example of machine type communication (MTC).

The MTC refers to information exchange performed between MTC apparatuses 100 via a BS 200 without human interactions or information exchange performed between the MTC apparatus 100 and an MTC server 700 via the BS.

The MTC server 700 is an entity for communicating with the MTC apparatus 100. The MTC server 700 executes an MTC application, and provides an MTC-specific service to the MTC apparatus.

The MTC apparatus 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC apparatus is characterized in that a transmission data amount is small and uplink/downlink data transmission/reception occurs sometimes. Therefore, it is effective to decrease a unit cost of the MTC apparatus and to decrease battery consumption according to a low data transmission rate. The MTC apparatus is characterized of having a small mobility, and thus is characterized in that a channel environment does almost not change.

Figure 10B:
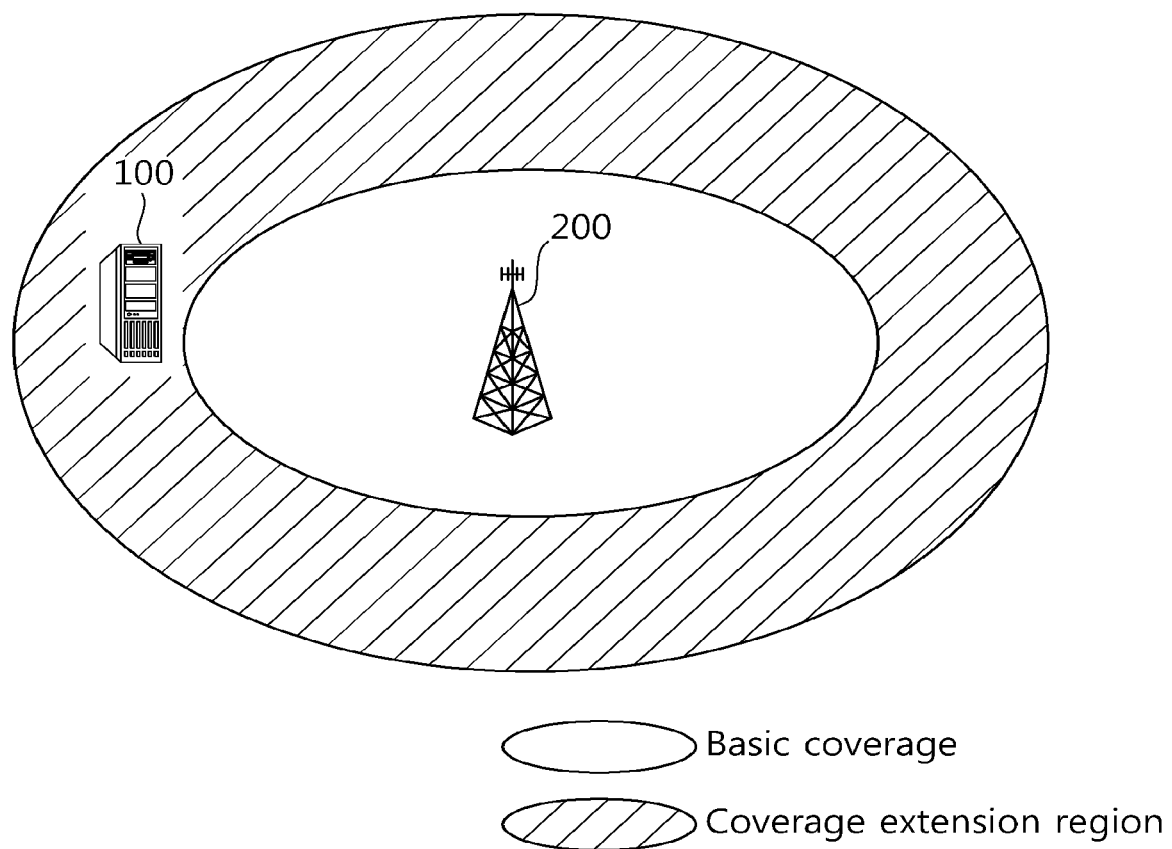
FIG. 10B illustrates an example of cell coverage extension for an MTC apparatus.

FIG. 10B illustrates an example of cell coverage extension for an MTC apparatus.

Recently, it is considered to extend cell coverage of a BS for an MTC apparatus 100, and various schemes for extending the cell coverage are under discussion.

However, when the cell coverage is extended, if the BS transmits a PDSCH and a PDCCH including scheduling information for the PDSCH to the MTC apparatus located in the coverage extension region as if it is transmitted to a normal UE, the MTC apparatus has a difficulty in receiving them.

Embodiments of the Present Invention

Thus, embodiments of the present invention are provided to solve the foregoing problem.

According to an embodiment of the present invention, to solve the foregoing problem, when a BS transmits a PDSCH and PDCCH to an MTC apparatus 100 located in a coverage extension region, the BS repeatedly transmits the PDSCH and PDCCH on a plurality of subframes (for example, a bundle of subframes). Thus, the MTC apparatus receives a bundle of PDCCHs through the plurality of subframes and decode the bundle of PDCCHs, thereby increasing decoding success rate. That is, the MTC apparatus may decode a portion or all of the PDCCHs in the bundle received through a plurality of subframes, thereby successfully decoding PDCCHs. Likewise, the MTC apparatus receives a bundle of PDSCHs through a plurality of subframes and decodes a portion or all of PDSCHs in the bundle, thereby increasing decoding success rate.

Similarly, the MTC apparatus located in the coverage extension region may transmit a bundle of PUCCHs through a plurality of subframes. Also, the MTC apparatus may transmit a bundle of PUSCHs through a plurality of subframes.

However, when PDSCHs and PDCCHs are repeatedly transmitted on a plurality of subframes as described above, there may arise problems in transmission timings of ACKs/NACKs of the PDSCHs (for example, transmission timing of a PUCCH including an ACK/NACK) and in transmission timing of PUSCHs. Further, there may arise problems in determining a subframe for transmitting an ACK/NACK after receiving a PDCCH and in determining a subframe for transmitting a PUSCH.

Thus, solutions to such problems will be described below.

(A) Solution to Problem in Transmission Timings of ACK/NACK of PDSCH

As described above, an MTC apparatus located in a coverage extension region may transmit a bundle of PUCCHs including an ACK/NACK of a received PDSCH on a plurality of subframes. When the bundle of PUCCHs is transmitted through the plurality of subframes, a BS decodes all or a portion of the PUCCHs in the bundle received on the plurality of subframes, thereby increasing decoding success rate.

Figure 11:
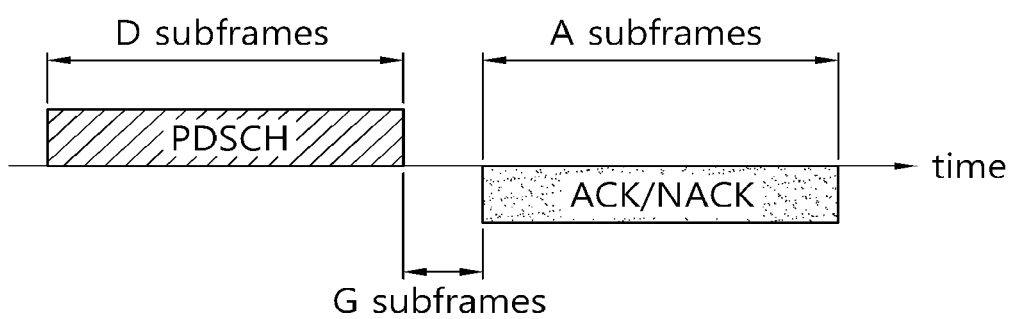
FIG. 11 illustrates an example of a time interval between a PDCCH bundle and a PUCCH bundle including an ACK/NACK of the PDCCH bundle.

As shown in FIG. 11, the BS may transmit a bundle of PDSCHs to an MTC apparatus on D subframes. The MTC apparatus successfully receiving the PDSCHs through the D subframes may transmit a PUCCH or PUSCH including an ACK/NACK of the PDSCHs on A subframes.

Here, the MTC apparatus may need to determine a timing for transmitting the ACK/NACK. Transmission timings are described in FDD and TDD, respectively.

First, an FDD case is described as follows.

In an FDD environment, as shown in FIG. 11 defining a last subframe among the subframes transmitting the bundle of PDSCHs as 'subframe n,' the bundle of PUCCHs/PUSCHs including the ACK/NACK may be transmitted through from 'subframe n+G.'

Here, G may be, for example, 4. For instance, when transmission of the bundle of PDSCHs is finished at 'subframe n,' the MTC apparatus may transmit the bundle of PUCCHs/PUSCHs including the ACK/NACK of the PDSCHs to the BS through from 'subframe n+4.'

Next, a TDD case is described as follows.

In a TDD environment, subframes for uplink transmission and subframes for downlink transmission are designated in Table 1. Therefore, when transmission of the bundle of PDSCHs is finished at 'subframe n' and the MTC apparatus starts transmitting the bundle of PUCCHs/PUSCHs including the ACK/NACK from 'subframe n+G,' G may not be a constant value.

Thus, in the TDD environment, when transmission of the bundle of PDSCHs is finished at 'subframe n,' the MTC apparatus may start transmitting the bundle of PUCCHs/PUSCHs including the ACK/NACK through from a first available subframe for uplink transmission among subframes subsequent to 'subframe n+4.' For example, according to UL-DL configuration 1 illustrated in Table 1, when transmission of the bundle of PDSCHs is finished at subframe 0, the MTC apparatus may start transmitting the bundle of PUCCHs/PUSCHs including the ACK/NACK at subframe 7, which is a first available subframe for uplink transmission, among subframes subsequent to subframe 4.

Alternatively, in the TDD environment, when transmission of the bundle of PDSCHs is finished at 'subframe n' and the MTC apparatus transmits the bundle of PUCCHs/PUSCHs including the ACK/NACK through a plurality of subframes from 'subframe n+G,' it is suggested in the present invention to determine G as in Table 2 considering the positions of downlink subframes, uplink subframes and special subframes in order to evenly distribute subframe resources for transmitting the PUCCHs/PUSCHs.

Table 2 illustrates G according to a UL-DL configuration when defining the position of a subframe at which transmission of the bundle of PDSCHs is finished as 'subframe n.' For example, in the use of UL-DL configuration 2 in Table 1, when transmission of the bundle of PDSCHs is finished at subframe 5, G is 7 according to Table 2. Thus, the MTC apparatus starts transmitting the PUCCHs/PUSCHs including the ACK/NACK from subframe 12, which is seven subframes apart from subframe 5.

TABLE 2

| UL-DL configuration | Subframe n (last subframe for transmitting PDSCH bundle) | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

(B) Solution to PUSCH Transmission Timing Problem

An MTC apparatus located in a coverage extension region may repeatedly receive a bundle of PDCCHs including an uplink grant on a plurality of subframes and transmit a bundle of PUSCHs on a plurality of subframes through an uplink resource indicated by the uplink grant.

Figure 12:
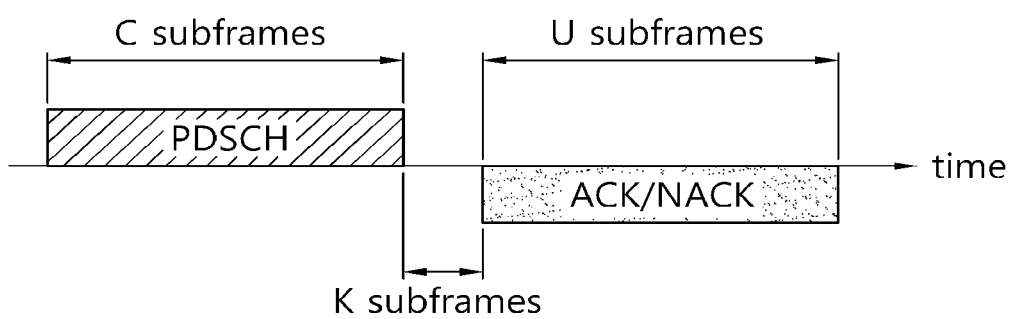
FIG. 12 illustrates an example of a time interval between a PDCCH bundle and a PUSCH bundle.

For example, as shown in FIG. 12, a BS transmits a bundle of PDCCHs including an uplink grant to the MTC apparatus through C subframes, the MTC apparatus may transmit a bundle of PUSCHs on U subframes according to the uplink grant.

Here, it is needed to determine transmission timings for the bundle of PDCCHs and the bundle of PUSCHs. Transmission timings are described in FDD and TDD, respectively.

First, an FDD case is described as follows.

In an FDD environment, as shown in FIG. 12, defining the position of a subframe at which transmission of the bundle of PDCCHs is finished as 'subframe n,' the bundle of PUSCHs related to the PDCCHs may be transmitted through from 'subframe n+K.'

In the FDD environment, K may be, for example, 4. That is, when transmission of the bundle of PDCCHs is finished at 'subframe n,' the MTC apparatus may transmit the bundle of PUSCHs related to the PDCCHs through a plurality of subframes from 'subframe n+4.'

Next, a TDD case is described as follows.

In a TDD environment, subframes for uplink transmission and subframes for downlink transmission are designated in Table 1. Therefore, when transmission of the bundle of PDSCHs is finished at 'subframe n' and the MTC apparatus starts transmitting the bundle of PUSCHs from 'subframe n+K,' K may not be a constant value.

Thus, in the TDD environment, when transmission of the bundle of PDSCHs is finished at 'subframe n,' the MTC apparatus may start transmitting the bundle of PUSCHs through from a first available subframe for uplink transmission among subframes subsequent to 'subframe n+4.' For example, according to UL-DL configuration 1 illustrated in Table 1, when transmission of the bundle of PDSCHs is finished at subframe 0, the MTC apparatus may start transmitting the bundle of PUSCHs at subframe 7, which is a first available subframe for uplink transmission, among subframes subsequent to subframe 4.

Alternatively, in the TDD environment, when transmission of the bundle of PDSCHs is finished at 'subframe n' and the MTC apparatus transmits the bundle of PUSCHs through a plurality of subframes from 'subframe n+K,' it is suggested in the present invention to determine K as in Table 3 considering the positions of downlink subframes, uplink subframes and special subframes in order to evenly distribute subframe resources for transmitting the PUSCHs.

Table 3 illustrates K according to a UL-DL configuration when defining the position of a subframe at which transmission of the bundle of PDSCHs is finished as 'subframe n.' For example, in the use of UL-DL configuration 2 in Table 1, when transmission of the bundle of PDSCHs is finished at subframe 6, K is 6 according to Table 3. Thus, the MTC apparatus starts transmitting the PUSCHs from subframe 12, which is six subframes apart from subframe 6.

TABLE 3

| UL-DL configuration | Subframe n (last subframe for transmitting PDSCH bundle) | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | 4 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Meanwhile, in the TDD environment, when a first PDCCH bundle and a second PDCCH bundle are transmitted from the BS to the MTC apparatus, there is a possibility that the position of a subframe for transmitting a first PUSCH bundle with respect to the first PDCCH bundle overlap with the position of a subframe for transmitting a second PUSCH bundle with respect to the second PDCCH bundle.

Thus, one embodiment of the present invention suggests that the BS finishes transmitting a PDCCH bundle only on a particular downlink subframe. Specifically, in the embodiment, the BS finishes transmission of a PDCCH bundle only at a subframe position illustrated in Table 4 according to a UL-DL configuration.

That is, when the BS transmits a PDCCH bundle to the MTC apparatus, the BS may notify in advance the MTC apparatus that PDCCHs are transmitted through C subframes. Then, after transmission of the PDCCH bundle is started at a particular subframe, the PDCCH bundle may be transmitted during the C subframes. Here, the position of a subframe at which transmission of the PDCCH bundle is finished may be 'subframe m.'

TABLE 4

| UL-DL configuration | Subframe m (last subframe for transmitting PDCCH bundle) |
|---|---|
| 0 | 0, 1, 5, 6 |
| 1 | 1, 4, 6, 9 |
| 2 | 3, 8 |
| 3 | 0, 8, 9 |
| 4 | 8, 9 |
| 5 | 8 |
| 6 | 0, 1, 5, 6, 9 |

However, depending on a situation, transmission of the PDCCH bundle from the BS may not actually be finished at a subframe illustrated in Table 4. That is, the position of a subframe at which transmission of the PDCCH bundle from the BS is actually finished may be different from subframe m illustrated in Table 4. In this case, the MTC apparatus may not determine an appropriate position of a subframe for starting transmission of a PUSCH bundle. Hereinafter, a solution to such a problem is described.

To solve the foregoing problem, one embodiment of the present invention suggests that the BS continues transmission of the PDCCH bundle up to the position of an earliest subframe among values of subframe m, illustrated in Table 4, subsequent to a subframe at which transmission of the PDCCH bundle is scheduled to be finished. In this case, the MTC apparatus identifies the position of the subframe at which transmission of the PCDDHs is finished, not the position of the subframe at which transmission of the PDCCHs is originally scheduled to be finished, as a PDCCH transmission end subframe.

For example, when UL-DL configuration 3 is used, subframe positions where transmission of the PDCCH bundle is originally scheduled to be finished may be 0, 8, and 9. However, when transmission of the PDCCH bundle is actually finished on subframe 3 the BS may continue transmission of the PDCCH bundle up to subframe 8, which is an earliest subframe on which transmission of the PDCCH bundle can be finished, among subframes subsequent to subframe 3. Thus, the MTC apparatus may receive the PDCCH bundle on up to subframe 8, not up to subframe 3 and recognize subframe 8 as a PDCCH bundle transmission end subframe. Alternatively, the MTC apparatus may receive the PDCCH bundle on only up to subframe 3 that is a subframe in which reception of the PDCCH bundle is originally scheduled to be finished and assume, as subframe 8, the position of a subframe in which reception of the PDCCH bundle is finished, which is needed for calculating the position of a subframe for transmitting the PUSCH bundle.

(C) Determination of Subframe for Transmitting ACK/NACK of PDSCH

As shown in FIG. 11, a BS may transmit a bundle of PDSCHs to the MTC apparatus on D contiguous or non-contiguous downlink subframes. The MTC apparatus successfully receiving the bundle of PDSCHs through the D subframes may transmit PUCCHs or PUSCHs containing an ACK/NACK of the bundle of PDSCHs on A contiguous or non-contiguous downlink subframes. Here, the positions of the subframes transmitting the PDSCHs may be transmitted from the BS to the MTC apparatus through an MIB, SIB, or the like. For example, the positions of the subframes transmitting the bundle of PDSCHs to the MTC apparatus in a 10-msec radio frame may be transmitted to the MTC apparatus in a bitmap format.

This scheme may also be applied to a TDD system, which is described, for example, with reference to FIG. 13 as follows.

Figure 13:
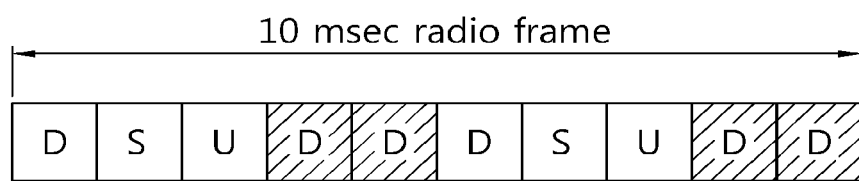
FIG. 13 illustrates an example of positions of subframes for transmitting a PDSCH bundle in a TDD environment.

As shown in FIG. 13, a bundle of PDSCHs may be transmitted to an MTC apparatus located in a coverage extension region on all or a portion of downlink subframes. In this case, the positions of the subframes available for transmission of the PDSCHs to the MTC apparatus located in the coverage extension region among the subframes in the 10-msec radio frame may be transmitted to the MTC apparatus using the bitmap format.

Defining the number of subframes for transmitting a bundle of PDSCHs to an MTC apparatus located in a coverage extension region in each 10-msec radio frame as ND, the positions of the subframes for transmitting the bundle of PDSCHs to the MTC apparatus in the 10-msec radio frame may be represented by Di. Here, i may be 0, 1, ..., ND.

TABLE 5

| UL-DL configuration | $D_i$ | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

Here, one embodiment of the present invention suggests a method for determining the positions of subframes for transmitting ACKs/NACKs of the PDSCHs according to the positions of the subframes for transmitting the bundle of PDSCHs to the MTC apparatus in each 10-msec radio frame.

In this case, defining the number of subframes for the MTC apparatus to transmit an ACK/NACK in each 10-msec radio frame as NA, the positions of the subframes for the MTC apparatus to transmit the ACK/NACK in the 10-msec radio frame may be determined according to (Di+Gi) mod 10. Here, i may be 0, 1, ..., ND.

For instance, one embodiment of the present invention suggests that Gi for determining the positions of subframes for transmitting ACKs/NACKs of the PDSCHs depending on the positions of the subframes for transmitting the bundle of PDSCHs to the MTC apparatus located in the coverage extension region has a relationship in Table 5. Table 5 illustrates Gi according to the position Di of a subframe for transmitting the bundle of PDSCHs in each UL-DL configuration. According to Table 5, for example, when UL-DL configuration 3 is used, since Gi related to the position of a PDSCH transmitted through subframe 5 is 7, the position of an ACK/NACK transmission subframe related to the position of the PDSCH transmitted through subframe 5 is subframe 2, obtained by (5+7) mod 10=2.

According to the suggested operation, for example, in a case of TDD uplink/downlink configuration 2, as shown in FIG. 13, when PDSCHs are transmitted to the MTC apparatus located in the coverage extension region on subframes 3, 4, 8, and 9, the position of a subframe for transmitting an ACK/NACK of the PDSCHs may be calculated as follows.

The positions of the subframes for transmitting the bundle of PDSCHs may be expressed as D1=3, D2=4, D3=8, and D4=9. Since UL-DL configuration 2 is used, Gi is obtained from Table 5 such that G1=4, G2=8, G3=4, and G4=8. The positions of subframes for transmitting an ACK/NACK are (D1+G1) mod 10=7, (D2+G2) mod 10=2, (D3+G3) mod 10=2, and (D4+G4) mod 10=7. Accordingly, the positions of subframes for the MTC apparatus to transmit an ACK/NACK of the received PDSCHs are subframe 2 and subframe 7.

Figure 14:
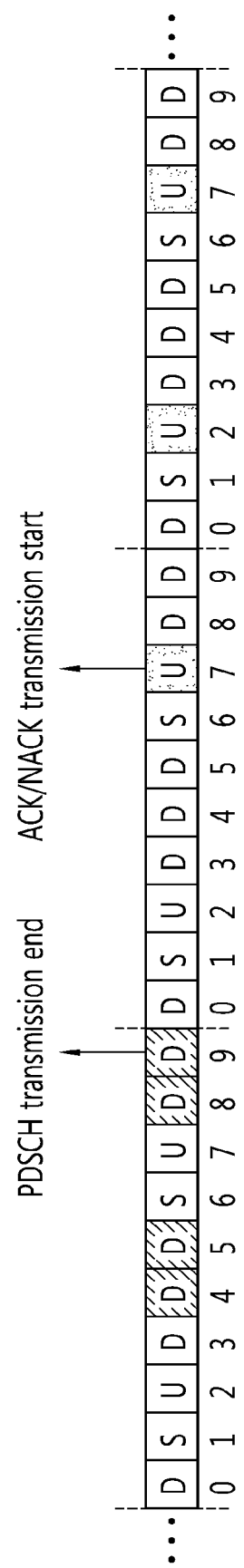
FIG. 14 illustrates another example of positions of subframes for transmitting a PUSCH bundle in the TDD environment.

For example, as shown in FIG. 14, after finishing receiving the PDSCHs, the MTC apparatus may start transmission of a PUCCH/PUSCH including an ACK/NACK on subframes 2 and 7.

Meanwhile, one embodiment of the present invention suggests another method for transmitting a bundle of PUCCHs/PUSCHs including an ACK/NACK of a bundle of PDSCHs on a plurality of subframes after the MTC apparatus receives the bundle of PDSCHs in the TDD environment. When transmission of the bundle of PDSCHs to the MTC apparatus is finished at 'subframe n,' the MTC apparatus may transmit the bundle of PUCCHs/PUSCHs including the ACK/NACK on a plurality of subframes (that is, NA subframes) from 'subframe n+G.' Here, the MTC apparatus may transmit the PUCCHs/PUSCHs including the ACK/NACK of the bundle of PDSCHs only on 'subframes n+G*a.' Here, a may be 0, 1, ..., NA. Here, G may be determined according to Table 12.

(D) Determination of Subframe for Transmitting PUSCH

The MTC apparatus located in the coverage extension region may receive a bundle of PDCCHs including an uplink grant and then transmit a bundle of PUSCHs through an uplink resource indicated by the uplink grant.

Here, as described above, the positions of subframes for transmitting the bundle of PDCCHs may be transmitted through an MIB, SIB, or the like from the BS to the MTC apparatus. That is, as described above, the positions of the subframes for transmitting the bundle of PDCCHs to the MTC apparatus in a 10-msec radio frame may be transmitted to the MTC apparatus in a bitmap format. Particularly, in the TDD environment, it may be efficient to transmit the positions of the subframes for transmitting the bundle of PDCCHs to the MTC apparatus in the 10-msec radio frame to the MTC apparatus in the bitmap format. The positions of the subframes for transmitting the bundle of PDCCHs are illustrated in Table 6. In particular, it may be very effective to notify the MTC apparatus of the positions of the subframes for transmitting the bundle of PDCCHs including the uplink grant in the bitmap format. Accordingly, the MTC apparatus recognizes that the bundle of PDCCHs including the uplink grant can be received only on the subframes illustrated in Table 6, thereby remarkably reducing complexity. Alternatively, the MTC apparatus may use the positions of the subframes illustrated in Table 6 only to obtain the positions of subframes for transmitting the PUSCHs.

TABLE 6

| TDD UL/DL configuration | Subframe for transmitting PDCCH bundle including uplink grant |
|---|---|
| 0 | 0, 1, 5, 6 |
| 1 | 1, 4, 6, 9 |
| 2 | 3, 8 |
| 3 | 0, 8, 9 |
| 4 | 8, 9 |
| 5 | 8 |
| 6 | 0, 1, 5, 6, 9 |

Meanwhile, defining the number of subframes for transmitting a bundle of PDCCHs including an uplink grant to the MTC apparatus in each 10-msec radio frame as NC, the positions of the subframes for transmitting the bundle of PDCCHs including the uplink grant to the MTC apparatus located in the coverage extension region in the 10-msec radio frame may be represented by Ci. Here, i may be 0, 1, . . . , NC.

Here, the present invention suggests determining the positions of subframes for transmitting PUSCHs with respect to the PDCCHs (uplink grant) according to the positions of the subframes for transmitting the PDCCHs (uplink grant) to the MTC apparatus located in the coverage extension region in each 10-msec radio frame.

In this case, defining the number of subframes in each 10-msec radio frame for the MTC apparatus located in the coverage extension region to transmit PUSCHs as NU, the positions of the subframes in the 10-msec radio frame for the MTC apparatus located in the coverage extension region to transmit a bundle of PUSCHs may be expressed as $(C_i+K_i)$ mod 10. Here, i may be 0, 1, . . . , NC. Table 7 illustrates $K_i$ according to Ci. More specifically, Table 7 illustrates $K_i$ for determining the positions of subframes for the MTC apparatus to transmit a bundle of PUSCHs according to the positions of subframes for the MTC apparatus to receive a bundle of PDCCHs including an uplink grant.

TABLE 7

| TDD UL/DL configuration | $C_i$ | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | 6 | | | 4 |
| 2 | | | 4 | | | | | | 4 | |

TABLE 7-continued

| TDD UL/DL configuration | $C_i$ | | | | | | | | | |
|---|---|---|---|---|---|---|---|---|---|---|
| | 0 | 1 | 2 | 3 | 4 | 5 | 6 | 7 | 8 | 9 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

According to Table 7, for example, when UL-DL configuration 1 is used, since $K_i$ related to subframe 6 for transmitting a bundle of PDSCHs is 6, the position of a subframe for transmitting the bundle of PUSCHs is determined by (6+6) mod 10=2.

However, when the subframe Ci for transmitting the bundle of PDCCHs including the uplink grant is not the position of a subframe illustrated in Table 6, the MTC apparatus may not consider the position of the subframe in determining a subframe for transmitting a PUSCH.

For example, in the use of UL-DL configuration 1, when the MTC apparatus can receive a bundle of PDCCHs including an uplink grant on subframes 1, 4, and 6, the position of a subframe for transmitting a bundle of PUSCHs with respect to the bundle of PDCCHs may be calculated as follows. First, the positions of the subframes for transmitting the bundle of PDCCHs may be expressed as C1=1, C2=4, and C3=6. Since UL-DL configuration 1 is used, Ki is obtained from Table 7 such that K1=6, K2=4, and K3=6. The positions of subframes for the MTC apparatus to transmit the bundle of PUSCHs are (C1+K1) mod 10=7, (C2+K2) mod 10=8, and (C3+K3) mod 10=2. To sum up, the positions of the subframes for the MTC apparatus to transmit the bundle of PUSCHs are subframes 2, 7, and 8.

Meanwhile, one embodiment of the present invention suggests another method for transmitting a bundle of PUSCHs on a plurality of subframes after the MTC apparatus receives a bundle of PDCCHs including an uplink grant in the TDD environment. For example, when the MTC apparatus finishes transmission of a bundle of PDCCHs at 'subframe n,' the MTC apparatus may transmit a bundle of PUSCHs on NU subframes from 'subframe n+K.' More specifically, the MTC apparatus may transmit the bundle of PUSCHs on 'subframes n+K*a.' Here, a may be 0, 1, . . . , NU, and K may be obtained from Table 3.

The aforementioned embodiments of the present invention can be implemented through various means. For example, the embodiments of the present invention can be implemented in hardware, firmware, software, combination of them, etc. Details thereof will be described with reference to the drawing.

Figure 15:
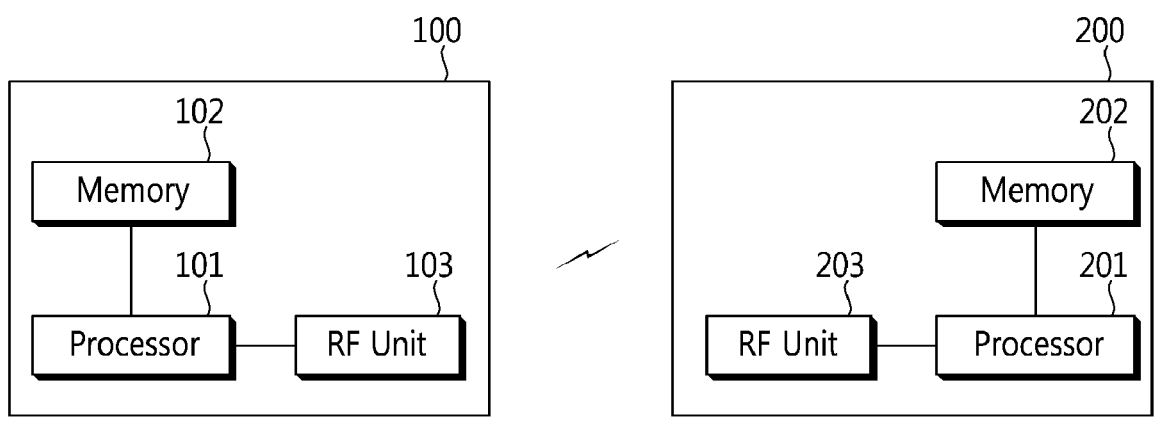
FIG. 15 is a block diagram illustrating a wireless communication system according to an embodiment of the present invention.

FIG. 15 is a block diagram illustrating a wireless communication system according to an embodiment of the present invention.

The base station (BS) 200/300 includes processor 201/301, memory 202/302, and radio frequency (RF) unit 203/303. The memory 202/302 coupled with the processor 201/301 stores a variety of information for driving the processor 201/301. The RF unit 203/303 coupled to the processor 201/301 transmits and/or receive radio signals. The processor 201/301 implements the proposed functions, procedures, and/or methods. In the aforementioned embodiment, an operation of the BS may be implemented by the processor 201/301.

The MTC apparatus 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting a physical uplink shared channel (PUSCH), the method performed by a wireless device and comprising:
   receiving downlink control information (DCI), which is repeated on a plurality of downlink subframes;
   identifying a last subframe on which the repetition is completed;
   determining that the identified last subframe is not used for determining a start subframe to repeatedly transmit the PUSCH;
   substituting the last subframe with a first subframe usable for determining the start subframe to transmit the PUSCH after the identified last subframe, based on the determination that the identified last subframe is not used for determining the start subframe;
   determining the start subframe to transmit the PUSCH, based on the first subframe other than the last subframe; and
   transmitting the PUSCH repeated over a plurality of subframes starting from the determined start subframe.

2. The method of claim 1, further comprising:
   receiving information on the number of downlink subframes for repeatedly receiving the DCI.

3. The method of claim 1, wherein the wireless device is located on a coverage enhancement region.

4. The method of claim 1, further comprising:
   receiving information specifying a plurality of subframes used for the wireless device to receive the DCI and transmit the PUSCH.

5. The method of claim 4, wherein the information specifying the plurality of subframes used for the wireless device to receive the DCI is expressed as a bitmap in a system information block (SIB).

6. The method of claim 5, wherein the bitmap includes 10 bits.

7. The method of claim 1, wherein the first subframe, usable for determining the start subframe to transmit the PUSCH is expressed according to a time division duplex (TDD) uplink/downlink configuration as follows:

| Uplink/downlink configuration | Position of subframe |
| --- | --- |
| 0 | 0, 1, 5, 6 |
| 1 | 1, 4, 6, 9 |
| 2 | 3, 8 |
| 3 | 0, 8, 9 |
| 4 | 8, 9 |
| 5 | 8 |
| 6 | 0, 1, 5, 6, 9. |

8. A wireless device for transmitting a physical uplink shared channel (PUSCH), the wireless device comprising:
   a transceiving unit; and
   a processor operatively connected to the transceiving unit and configured to:
     receive downlink control information (DCI), which is repeated on a plurality of downlink subframes;
     identify a last subframe on which the repetition is completed;
     determine that the identified last subframe is not used for determining a start subframe to repeatedly transmit the PUSCH;
     substitute the last subframe with a first subframe usable for determining the start subframe to transmit the PUSCH after the identified last subframe, based on the determination that the identified last subframe is not used for determining the start subframe;
     determine the start subframe to transmit the PUSCH, based on the first subframe other than the last subframe; and
     transmit the PUSCH repeated over a plurality of subframes starting from the determined start subframe.

9. The wireless device of claim 8, wherein the processor is further configured to:
   receive information on the number of downlink subframes for repeatedly receiving the DCI.

10. The wireless device of claim 8, wherein the wireless device is located on a coverage enhancement region.

11. The wireless device of claim 8, wherein the processor is further configured to:
   receive information specifying a plurality of subframes used for the wireless device to receive the DCI and transmit the PUSCH.

12. The wireless device of claim 11, wherein the information specifying the plurality of subframes used for the wireless device to receive the DCI is expressed as a bitmap in a system information block (SIB).

13. The wireless device of claim 12, wherein the bitmap includes 10 bits.

14. The wireless device of claim 8, wherein the first subframe, usable for determining the start subframe to transmit the PUSCH is expressed according to a time division duplex (TDD) uplink/downlink configuration as follows:

| Uplink/downlink configuration | Position of subframe |
| --- | --- |
| 0 | 0, 1, 5, 6 |
| 1 | 1, 4, 6, 9 |
| 2 | 3, 8 |
| 3 | 0, 8, 9 |
| 4 | 8, 9 |

-continued

| Uplink/downlink configuration | Position of subframe |
|---|---|
| 5 | 8 |
| 6 | 0, 1, 5, 6, 9. |

* * * * *